United States Patent [19]

Wilson et al.

[11] Patent Number: 4,883,125
[45] Date of Patent: Nov. 28, 1989

[54] CEMENTING OIL AND GAS WELLS USING CONVERTED DRILLING FLUID

[75] Inventors: William N. Wilson; Leon H. Miles; Brett H. Boyd, all of Plano; Robert B. Carpenter, Hurst, all of Tex.

[73] Assignee: Atlantic Richfield Company, Los Angeles, Calif.

[21] Appl. No.: 131,878

[22] Filed: Dec. 11, 1987

[51] Int. Cl.⁴ .................. E21B 33/14; E21B 33/16
[52] U.S. Cl. .................................. 166/291; 166/293; 175/66
[58] Field of Search ............... 166/291, 292, 293, 295; 175/65, 66, 72; 523/130, 131

[56] References Cited

U.S. PATENT DOCUMENTS

| | | | |
|---|---|---|---|
| 2,805,719 | 9/1957 | Anderson | 166/292 |
| 3,168,139 | 2/1965 | Kennedy et al. | |
| 3,412,795 | 11/1968 | Terry | 166/285 |
| 3,499,491 | 3/1970 | Wyant et al. | 166/292 |
| 3,557,876 | 1/1971 | Tragesser | 166/292 |
| 3,730,900 | 5/1973 | Perricone et al. | |
| 3,887,009 | 6/1975 | Miller et al. | 166/292 |
| 4,036,660 | 7/1977 | Persinski et al. | 523/130 X |
| 4,124,075 | 11/1978 | Messenger | 166/293 |
| 4,176,720 | 12/1979 | Wilson | 166/293 |
| 4,217,229 | 8/1980 | Watson | 166/291 X |
| 4,476,029 | 10/1984 | Sy et al. | |
| 4,581,147 | 4/1986 | Branch III | |
| 4,646,834 | 3/1987 | Bannister | 166/291 |
| 4,680,128 | 7/1987 | Portnoy | 252/8.511 |

FOREIGN PATENT DOCUMENTS 207536 1/1987 European Pat. Off. .

Primary Examiner—George A. Suchfield
Attorney, Agent, or Firm—Michael E. Martin

[57] ABSTRACT

Wellbores are cemented with a cement composition formed from drilling fluid occupying the wellbore by circulating a quantity of drilling fluid mixed with a cement material and a dispersant such as a sulfonated styrene copolymer with or without an organic acid into the wellbore to displace the drilling fluid and to continuously convert the drilling fluid into the cement composition. The cement composition may be recirculated through the space in the wellbore to completely evacuate any drilling fluid not converted to cement so as to minimize any faults in the cement composition occupying the wellbore. A preflush composition containing the dispersant and being rheologoically compatible with both the drilling fluid and the drilling fluid converted to cement slurry may be used as a displacement fluid.

18 Claims, 2 Drawing Sheets

CEMENTING OIL AND GAS WELLS USING CONVERTED DRILLING FLUID

BACKGROUND OF THE INVENTION

1. Field of the Invention

The present invention pertains to cementing oil and gas wells with drilling fluid converted to a cementitious slurry which has been treated with a dispersant, is pumped into the space to be cemented sufficiently to displace substantially all of the drilling fluid and which may use one or more basic cement mediums and other additives.

2. Background

In the completion of oil and gas wells, it has been proposed to convert the drilling fluid or "mud" used during well drilling to a cement slurry for cementing casing or tubing in place or otherwise stabilizing or sealing the formation in the vicinity of the borehole. U.S. Pat. Nos. 3,168,139 to H. T. Kennedy, et al; 3,499,491 to R. E. Wyant et al; 3,557,876 to A. Tregasser; 3,887,009 to G. L. Miller et al; and 4,176,720 to William N. Wilson disclose well cement compositions which have been formed at least in part by well drilling fluids.

Many prior art efforts to convert drilling fluid to cement materials have posed certain problems in causing increased viscosity and flocculation of the drilling fluid as the cementitious material is added thereto and pumped into the wellbore. Converted drilling fluid compositions generally along the lines suggested in U.S. Pat. No. 3,499,491, for example, exhibit some gellation and are particularly temperature sensitive. In other words, if wellbore temperatures exceed a predetermined level, the cement composition has a tendency to set or harden rapidly. Since wellbore temperature conditions are difficult to control or predict in many instances, a reduced temperature sensitivity of the drilling fluid converted to cement is highly desirable.

Moreover, with prior art methods and compositions, the displacement of the drilling fluid has been incomplete due to gellation and has often resulted in poor cement bonds or incomplete filling of the casing-to-wellbore annulus with a homogeneous cement. In this regard, the present invention has been developed with a view to providing improved cement compositions through conversion of drilling fluids as well as an improved process for displacing drilling fluid from the wellbore and the casing-to-wellbore annulus so that a complete filling of the space to be cemented is accomplished with a homogeneous cement slurry.

SUMMARY OF THE INVENTION

The present invention provides an improved method and composition for converting well drilling fluids to cement slurries for cementing at least portions of a wellbore. In accordance with one aspect of the present invention, an improved cement slurry is provided using drilling fluid which is converted to a cement slurry by the addition of certain cementitious materials and a dispersant which minimizes the tendency for flocculation or gellation and the attendant viscosity increase to occur in the drilling fluid-cement mixture being formed and also to minimize the formation of gelled mixtures in the wellbore during displacement of nonconverted drilling fluid from the area to be cemented. The dispersant preferably comprises a sulfonated styrene copolymer with or without an organic acid. Accordingly, the present invention provides an improved cement slurry for cementing wellbores and which, upon contacting drilling fluid already in the wellbore spaces, will not, during displacement of said drilling fluid, tend to create flocculated or gelled fluid in the wellbore. Surprisingly, improved and substantially thorough displacement of drilling fluids is carried out using the improved cementitious slurry of the present invention which substantially minimizes the creation of pockets or spaces in the wellbore which contain nonconverted drilling fluid and also results in a cement slurry which exhibits minimal fluid loss properties.

In accordance with another aspect of the invention, a process for converting drilling fluids to a cementitious slurry is provided wherein a dispersant comprising a sulfonated styrene copolymer is added to the drilling fluid along with cementitious materials to prevent an undesirable increase in viscosity resulting from flocculation in the mixture. Styrene sulfonic acidmaleic anhydride (SSMA), sulfonated styrene imide (SSI), sulfonated styrene itaconic acid or a combination of a sulfonated styrene copolymer with one or more compounds from the groups of polyacrylates, potassium salts, phosphonates and other co- or ter- polymers of partially hydrolyzed polyacrylamides may be used as the dispersant and added to the drilling fluid in a mixture with a blended cementitious material to convert the fluid to an improved cement slurry.

The present invention also provides an improved process for cementing an oil and gas well by converting drilling fluid which is in place in the circulation system at the termination of drilling to a cement slurry by the addition of cementitious materials and a dispersant and by recirculating the converted cement mixture to thoroughly displace and convert to cement any drilling fluid in the region of the wellbore which is desired to be cemented.

In accordance with still a further aspect of the present invention, a cement slurry or composition utilizing converted drilling fluid is provided wherein one or more cementitious materials are added to the drilling fluid during the conversion process to control the hydration rate of the cement slurry and otherwise modify the physical properties of the slurry such that thorough displacement of drilling fluid by or conversion of drilling fluid to the cement slurry is provided in the spaces of interest in the wellbore.

The present invention further contemplates the provision of an improved displacement fluid which may be interposed between the drilling fluid in the wellbore and either a drilling fluid which has been converted to cement or a conventional Portland cement slurry. The displacement fluid serves as a flushing agent which further improves the evacuation of all of the drilling fluid from the wellbore and results in improved bonding of the cementitious slurry to surfaces in the wellbore such as the casing or drillpipe wall surfaces. The displacement fluid preferably includes a sulfonated styrene copolymer dispersant with or without an anionic and/or nonionic water wetting surfactant and with or without selected viscosifiers and weighting materials which will form a rheologically compatible fluid between the drilling fluid and the cementitious slurry.

Those skilled in the art will further appreciate the above described features of the present invention together with other superior aspects thereof upon reading the detailed description which follows.

DESCRIPTION OF PREFERRED EMBODIMENTS

Figure 1:
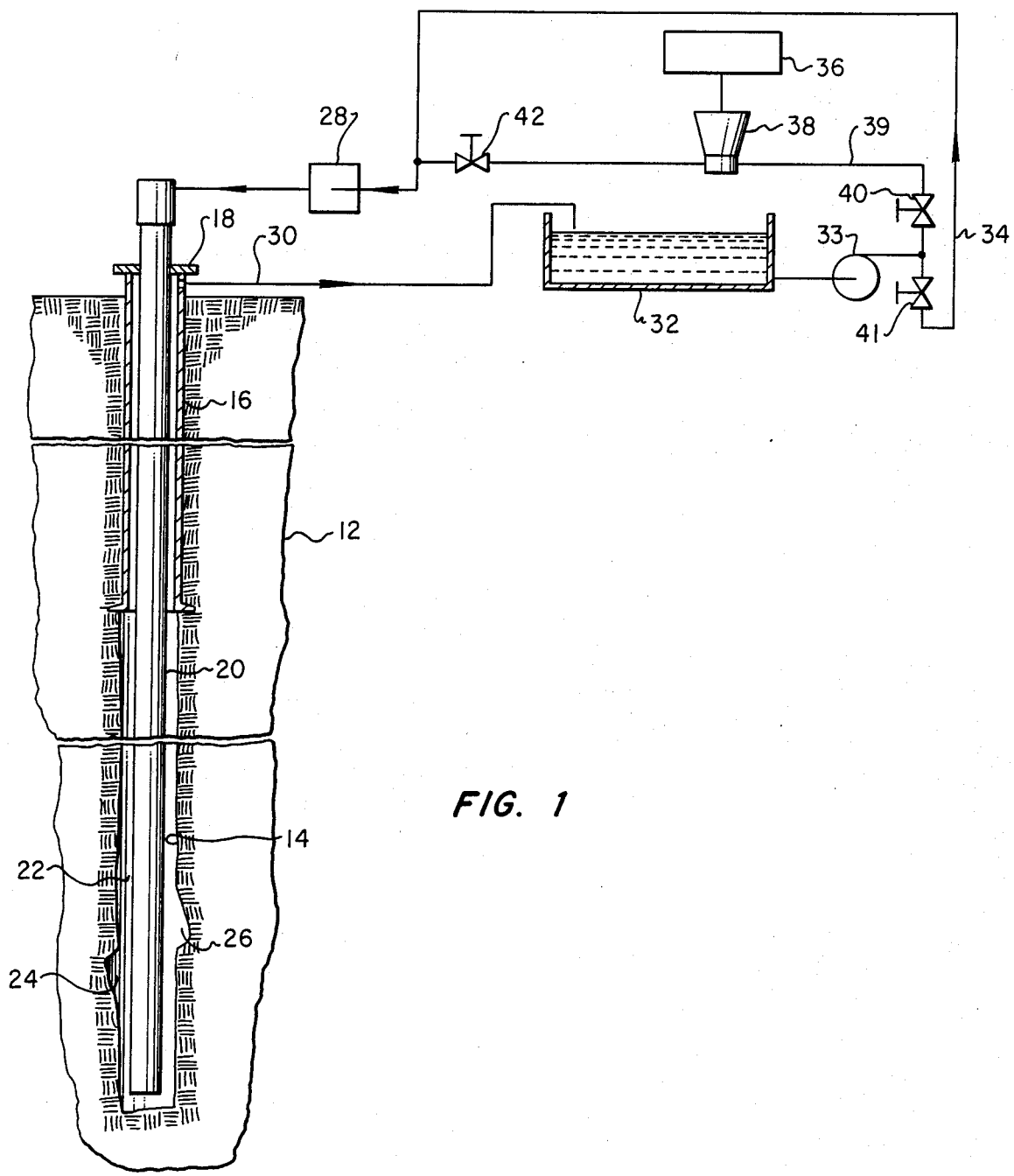
FIG. 1 is a schematic diagram of a wellbore and a fluid circulation system for continuous mixing of cement for cementing the wellbore to casing annulus using converted drilling fluid.

The conversion of well drilling fluids into cement slurries for cementing the wellbore to casing annulus and for performing other wellbore cementing operations is attractive for several reasons, namely, at least a major portion of the drilling fluid is not subject to waste disposal problems and regulations, the conversion of drilling fluid to a cement slurry minimizes the handling of the drilling fluid and the cement slurry, the cement slurry preparation time and expense is minimized and separation between the drilling fluid and the converted cementitious slurry is not required to be maintained, particularly when considering the process and compositions of the present invention.

The conversion of drilling fluid or "mud" to a cement slurry is not without some operational problems and undesirable compositional changes. For example, the addition of cementitious materials such as mixtures of lime, silicia and alumina or lime and magnesia, silica and alumina and iron oxide, or cement materials such as calcium sulphate and Portland cements to aqueous drilling fluids can substantially increase the viscosity of the fluid mixture and result in severe flocculation. Efforts to circulate such mixtures through a wellbore can result in a highly unsatisfactory circulation rate, plugging of the wellbore annulus, breakdown of the earth formation in the vicinity of the wellbore and a failure of the cement slurry to properly mix. Certain dispersants have been developed for use in drilling fluids during drilling operations including lignite and lignosulfonates.

One dispersant which has been commercially used in drilling fluid is a low molecular weight styrene sulfonic acidmaleic anhydride copolymer and a water soluble salt thereof (sometimes known as "SSMA"). U.S. Pat. No. 3,730,900 to A. C. Perricone, et al describes several drilling fluids which are treated with such a dispersant for stabilizing the rheological and fluid loss properties, particularly under high temperatures in the wellbore and in the presence of fluid contaminants. U.S. Pat. Nos. 4,476,029 to A. O. Sy et al., 4,581,147 to Homer Branch III, and 4,680,128 to R. C. Portnoy and European Patent Publication No. 0207536 P. Parcevaux et al. also disclose dispersants for drilling fluids and fluid spacer compositions. However, in spite of the state of the art as evidenced by the references cited herein and known to Applicants, there has remained the problem of effectively converting a drilling fluid to a suitable cement composition and displacing the drilling fluid in the borehole, including an annular area between a casing and the borehole, in a manner which provides effective occupancy of the area to be cemented with a composition which will form an effective bond with the well casing and/or plug the well or the earth formation adjacent the well with a barrier of sufficient strength to prevent migration of fluids in unwanted directions and/or prevent collapse of the walls of the borehole or collapse of the casing.

Moreover, although the addition of certain proportions of a sulfonated styrene copolymer or similar dispersant substantially reduces the tendency for flocculation or gelling of the mud converted to cement mixture, further efforts to develop a composition having a reduced viscosity and less tendency to cause gelling or flocculation has led to the discovery that the addition of certain proportions of organic acids such as sodium citrate, citric acid, gluco delta lactone, tartaric acid, erthorbic acid and other organic acids and long chain sugars in combination with the sulfonated styrene copolymer has a synergistic effect in reducing flocculation and viscosity of the mud converted to cement mixture. However, these organic acid additives may also retard the setting time of the cement slurry.

Referring briefly to FIG. 1, there is illustrated one system in accordance with the present invention for converting drilling fluid to a cement slurry for cementing a well casing in place in an earth formation 12 into which a wellbore 14 has penetrated. In the system illustrated in FIG. 1, a casing 16 has been extended into a portion of the formation from a wellhead 18 and a second casing 20 extends into the wellbore to form an annulus 22 which may include washouts or void areas 24 and 26, for example. The casing 20 extends to the wellhead 18 and is adapted to be in communication with a pump 28 for circulating drilling fluid down through the interior of the casing 20 and up through the annulus 22 to a return conduit 30. Drilling fluid is conducted through the return conduit 30 to a storage tank or pit 32 and is recirculated to the pump 28 through a pump 33 and a conduit 34 during normal drilling operations. Conventional drilling fluid treatment apparatus such as shale shakers, sand separators and related equipment have been eliminated from the diagrams of FIGS. 1 and 2 in the interest of conciseness.

One method for converting a drilling fluid to a cementitious slurry in accordance with this invention which is useful in wellbores requiring relatively large quantities of cement is to provide a premixed quantity of dry blended cement materials in suitable storage means 36 for conduction to a blending apparatus 38 of a type commercially available wherein the dry cement materials are blended with drilling fluid which is circulated to the pump 28 through a conduit 39 and the blending unit 38. Valves 40, 41 and 42 are operated to control the fluid flow path during the conversion process. The materials added to the blending unit 38 will be described herein in regard to several examples of converting drilling fluid to a cement slurry in accordance with the present invention. Suitable means for adding water, not shown, should also be provided. In many instances, and it is preferred, water and dispersant are added to the fluid before the other materials.

Figure 2:
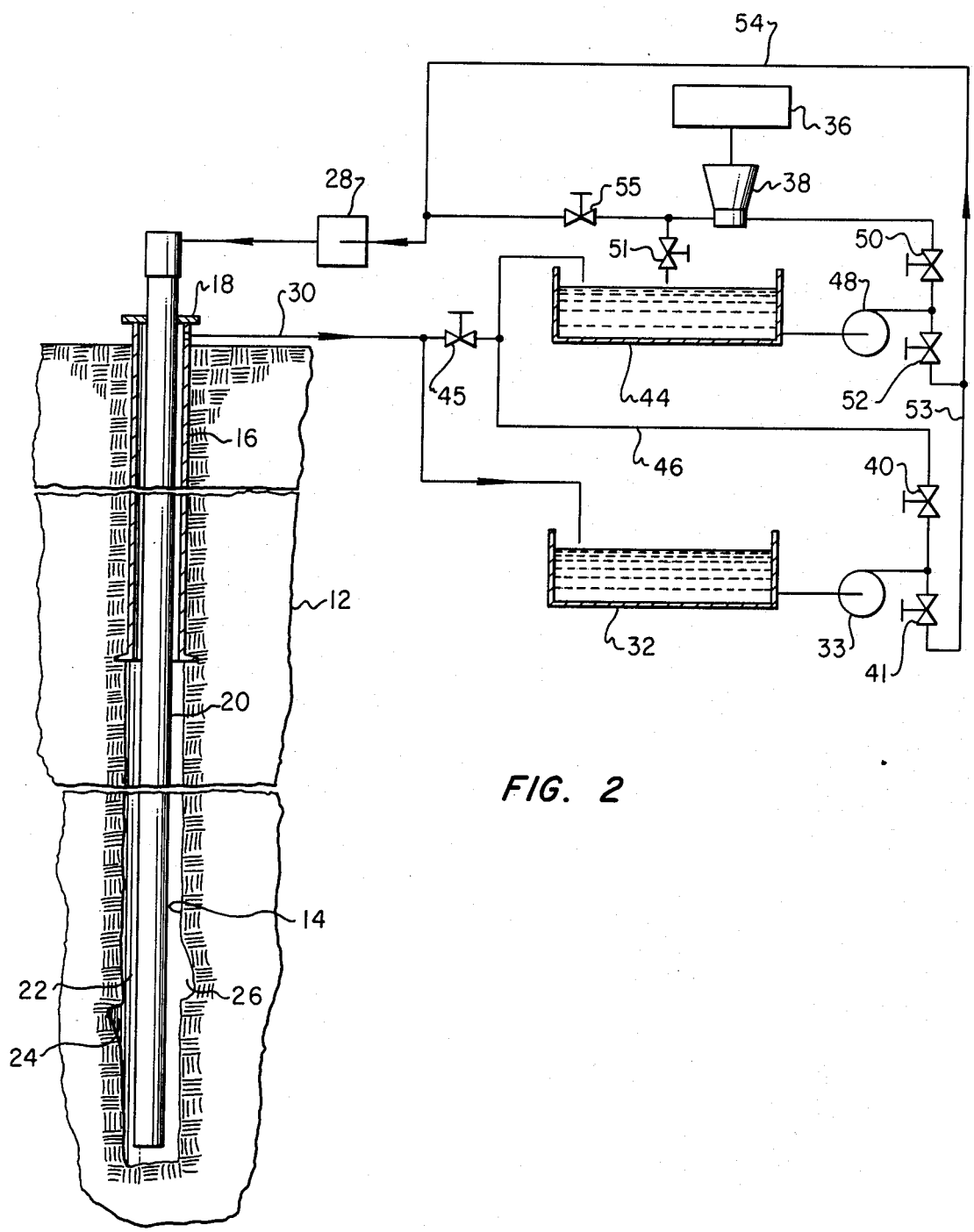
FIG. 2 is a schematic diagram of a cement mixing and circulation system adapted for batch mixing or continuous mixing of cement for converting drilling fluid.

FIG. 2 illustrates a system which provides increased flexibility in mixing processes in accordance with the present invention. The storage means 36 discharges predetermined quantities of dry blended cement materials of the type to be described herein into the blending unit 38 and the batch mixing is carried out in one or more tanks or pits 44 which have received drilling fluid from the tank 32 and the pump 33 by way of a conduit 46. The drilling fluid in the tank 44 is recirculated through the blending unit 38 by a pump 48, valve 50 and valve 51 until the proper mixture and density is achieved whereupon valves 50 and 52 are adjusted to conduct the cement slurry to the pump 28 through a conduit 54. Of course, during normal drilling operations the drilling fluid is circulated to the pump 28 through the conduit 30, the tank 32, the pump 33 and conduit 53, 54. The cementitious slurry may be recirculated between the wellbore 14 and the tank 44 by way of a connecting conduit having a valve 45 interposed therein. The system illustrated in FIG. 2 may be used to continuously supply a cementitious slurry to the pump 28 by closing valve 51 and opening valve 55.

Accordingly, with the systems illustrated in FIGS. 1 and 2, drilling fluid is readily converted to a cement slurry on either a continuous or batch mixing basis. Certain compositions of cement slurry as set forth herein may be held in one or more tanks 44, for example, for relatively long periods of time before injection into the wellbore. By continuous or batch mixing of the drilling fluid converted to cement only a small amount, if any, of the drilling fluid is subject to disposal requirements and all of the drilling fluid in the wellbore annulus 22 is eventually replaced with a cement composition which meets the requirements for cementing the casing in the wellbore 14 or for otherwise treating the formation 14 in the manner desired. As previously mentioned water, dispersant and other additives can be mixed into the fluid prior to adding the larger quantities of dry materials.

It is contemplated that the improved cement composition and method of cementing a well in an earth formation by converting drilling fluid in accordance with the present invention can be carried out with compositions and methods generally along the lines described herein. Water based drilling fluids having densities of about 9.0 pounds per gallon (ppg) to 18.0 ppg may be converted to cement and circulated through a wellbore such as the wellbore 14 by adding up to one hundred percent (100%) and preferably zero to fifty percent (0–50%) water, based on the original drilling fluid volume, together with a dispersant, comprising a sulfonated styrene copolymer, in the range of 0.50 to 10.0 pounds per original barrel of drilling fluid based on a 42 gallon barrel (hereinafter "ppb") and preferably less than about 5.0 ppb. By adding the dispersant at the time of conversion of the drilling fluid to a cement slurry, a surprising improvement in the mixing of the cement material into the drilling fluid has been realized. One source and specification of the sulfonated styrene copolymer may be a composition comprising a low molecular weight styrene sulfonic acid-maleic anhydride copolymer (SSMA) and commercially available under the trade name NARLEX D-72, from National Starch and Chemical Corporation, Bridgewater, N.J. The dispersant may be preblended with dry cement material and other additives as set forth herein and stored in the storage means 36, for example, or it may be added to the drilling fluid during addition of diluting water. Moreover, the dispersant may also comprise selected quantities of sulfonated styrene imide, sulfonated styrene itaconic acid or a combination of a sulfonated styrene copolyner with one or more compounds selected from a group consisting of polyacrylates, potassium salts, phosphonates and other co- or ter- polymers of partially hydrolysed polyacrylamides. Moreover, it is contemplated that monomers such as maleic anhydride, maleimide and dimethylmaleate may be added in combination with the selected copolymer.

Concurrent with or following the addition of the dispersant and diluting water to the former drilling fluid, Portland cement in a range of concentrations of from 100 ppb to 600 ppb is also added to the fluid. Hydration rate control compositions such as calcium sulphate may be used in the range of 10.0 ppb to 100.0 ppb of drilling fluid. Moreover, selected ones of several other additives such as setting retarders, accelerators, and fluid loss control compositions such as inorganic salts, calcium aluminate, lignosulfonates with or without organic acids, and polymers such as HEC, CMHEC, AMPS and acrylic acids may be premixed with the other materials. The above-described compositions may be further modified by the addition of silica sand in the amount of up to one hundred percent (100%) by weight of the Portland cement fraction of the cement slurry to increase the high temperature stability of the composition. Still further, the addition of other cementing mediums to the mix such as calcium aluminates and the abovementioned calcium sulphate can be added to control slurry thickening time, strength development rate and total compressive strength by changing the ratios of these mediums in the mix.

In the development of the present invention, initially a well was cemented utilizing a cement material of a type described in U.S. Pat. No. 3,499,491 and commercially available under the name "C-mix". This cement composition has been developed for use in converting drilling fluids to cement slurries. However, experience with this particular type of cement composition indicates still an abnormally high gellation of the drilling fluid upon adding the dry blended cement material (C-mix) to the drilling fluid. In pursuing the present invention it was decided to test this cement composition with the addition of a dispersant in the form of SSMA utilizing a water based lignosulfonate drilling mud having a density of approximately 12.3 ppg.

A well was cemented having a 5.0 inch diameter casing with placement of the cement initially at a depth of 10,000 feet and an indicated bottomhole temperature of approximately 166° F. A batch of 237 barrels of cement slurry was mixed and placed at a pumping rate of approximately 4.0 to 4.5 barrels per minute (bpm) with pumping pressures below about 500 psig. The cement slurry was found to be still particularly temperature sensitive as indicated by the thickening times specified in Table I below.

Table I, in addition to the formulation and thickening times, indicates compressive strength at wellbore temperatures and certain rheological parameters at temperatures indicated for the drilling fluid or "mud" alone and the mud to cement mixture (MTC) formed by the 195 ppb C-mix cement blend. The raw data indicated for the various speeds in RPM for each composition is that which is obtained by a rotational viscometer for determining shear stress and shear rate in accordance with API Specification No. 10. The rheological parameters indicated in the tables herein, including plastic viscosity (PV) indicated in centipoises and the yield point (YP) indicated in pounds per hundred feet squared, were measured with a rotating sleeve-stationary bob viscometer, using a #1 spring and a #1 bob and sleeve, such as a type Chan 35 manufactured by E. G. & G. Chandler Engineering, Tulsa, Ok. Without the increased dispersion provided by SSMA, the 195 ppb C-mix slurry was too viscous for the measurement range of the apparatus as equipped. The well was cemented utilizing a batch procedure generally in accordance with the arrangement illustrated in FIG. 2 of the drawings and following the general procedure for the batch mixing process described herein. The formulation quantities are per original barrel of drilling fluid. The resultant or final density of the drilling fluid converted to cement mixture was approximately 13.9 ppg:

TABLE I

Formulation:
1 bbl 12.3 ppg Lignosulfonate Mud
0.1 bbl Water
3.25 lbs SSMA
126.75 lbs Type I Portland Cement
33.15 lbs Sodium Silicate
29.25 lbs R.W. Clay
5.85 lbs Soda Ash
Thickening Times:
@ 160° F.: 16 hrs., 10 min.
@ 170° F.: 3 hrs., 50 min.
Compressive Strengths:
3 days @ 160° F.: 215 psi
13 days @ 160° F.: 932 psi
46 days @ 160° F.: 1
108 psi
Rheologies:

| | RPM | | | | | |
|---|---|---|---|---|---|---|
| | 600 | 300 | 200 | 100 | PV | YP |
| 80° F. Mud | 123 | 68 | 49 | 29 | 55 | 13 |
| MTC | 300+ | 297 | 234 | 156 | — | — |
| 120° F. Mud | 56 | 33 | — | — | 23 | 10 |
| MTC | 173 | 106 | — | — | 67 | 39 |

The cement composition was circulated into the wellbore at a rate of approximately 4.0 bpm for a period of two hours. The bottom 1000 feet of the wellbore annulus was subsequently cemented with a conventional cement tail slurry. Although the cement slurry (237 barrels) was batch mixed and not pumped into the wellbore for a period of 36 hours, the mixture was still pumpable after having cooled to a temperature of approximately 90° F. when pumped into the wellbore.

Because of the temperature sensitivity of the mixture using the C-mix slurry as identified in Table I and some evidence of a very small "micro" annulus formed around the casing-cement interface, a different cement composition was developed as described hereinbelow for filling a wellbore space in an 8.50 inch nominal wellbore diameter beginning at a depth of 8700 feet. A batch of 800 barrels of a cement slurry utilizing a lignosulfonate mud, water, SSMA, and a lignosulfonate retarder available under the trade name WR-15 from the Western Company of North America was mixed with a Class H (API grade) Portland cement together with a stability agent in the form of calcium sulfate hemihydrate in the quantities set forth in Table II. Density control was obtained by including a quantity of hollow pozzolan spheres or Cenospheres. A relatively lightweight cement slurry having a density of 11.3 ppg was formed and was found suitable for storage since it had an indicated thickening time of about 73 hours (times given in days are based on a 24 hour "day") at 190° F. and was indicated to be suitable for batch mixing and relatively long term storage. The rheology characteristics of this composition, as noted in Table II, provided a surprisingly easy to pump slurry which was prepared in a batching process and was placed in the wellbore and then circulated completely through the wellbore one full cycle (recirculation) at a rate of 10 bpm. During recirculation, using a system similar to that illustrated in FIG. 2, the cement slurry was pumped in a conventional manner through the circuit as if it were drilling fluid.

Formulation:
-continued
1 bbl 10.8 ppg Lignosulfonate Mud
0.543 bbl Water
1.6 lbs SSMA
0.784 lbs WR-15
392 lbs Class H Portland Cememt
150 lbs Cenospheres
42 lbs Calcium Sulfate
Thickening Time:
@ 190° F.: 3 days, 1 hr.
Compressive Strengths:
4 days @ 190° F.: 0 psi
3 days @ 80° F.: 100 psi
10 days @ 190° F.: 396 psi
10 days @ 80° F.: 358 psi
13 days @ 190° F.: 1079 psi
Rheologies:

| | RPM | | | | | |
|---|---|---|---|---|---|---|
| | 600 | 300 | 200 | 100 | PV | YP |
| 80° F. Mud | 44 | 24 | 12 | 10 | 20 | 4 |
| 90° F. MTC | 173 | 116 | — | — | 57 | 59 |

Table III sets forth the formulation for a cement slurry utilizing converted drilling fluid in the form of a lignosulfonate mud which was mixed using a conventional continuous mixing process and apparatus similar to that shown in FIG. 2. A nominal 8.50 inch diameter wellbore was cemented with a mix according to the formulation set forth in Table III mixing a total of 900 barrels of cement slurry and displacing the drilling fluid in the wellbore completely and recirculating the mix through two full recirculations at a rate of 8.0 to 8.5 bpm.

TABLE III

Formulation:
1 bbl 13.4 ppg Lignosulfonate Mud
0.1 bbl Water
4 lbs SSMA
315 lbs Class H Portland Cement
110.25 lbs 100 mesh silica sand
40 lbs Calcium Sulfate
Thickening Time:
@ 192° F. Pulled at 2 days and still fluid
Compressive Strengths:
2 days @ 220° F.: 354 psi
6 days @ 220° F.: 990 psi
13 days @ 75° F.: 227 psi
Rheologies:

| | RPM | | | | | |
|---|---|---|---|---|---|---|
| | 600 | 300 | 200 | 100 | PV | YP |
| 80° F. Mud | 86 | 56 | 43 | 28 | 30 | 26 |
| 190° F. Mud | 59 | 38 | 28 | 17 | 21 | 17 |
| 80° F. MTC | 281 | 164 | 117 | 68 | 117 | 47 |
| 190° F. MTC | 131 | 76 | 54 | 31 | 55 | 21 |

Table IV gives data regarding a continuously mixed cement slurry which was placed in a wellbore at a depth of 10,200 feet to cement the wellbore and two 2.875 inch diameter tubing strings in place in an open hole. The formulation set forth in Table IV produced a cement slurry having a density of 15.8 ppg and a commercially available retarder composition sold under the trademark WR-6 by Western Company of North America was used in the formulation. Drilling fluid was completely displaced from the wellbore and the fluid converted to cement slurry was recirculated an additional 50% of the wellbore displacement.

Circulation rate was approximately 4.5 bpm barrels per minute.

TABLE IV

Formulation:
1 bbl 12.4 ppg Lignosulfonate Mud
0 bbl Water
3 lbs SSMA
275 lbs Class H. Portland Cement
96.25 lbs 100 mesh silica sand
30 lbs Calcium Sulfate
0.55 lbs WR-6
Thickening Time:
@ 250° F.: 22 hours
Compressive Strengths:
1 day @ 285° F.: 214 psi
2 days @ 285° F.: 379 psi
3 days @ 285° F.: 544 psi
18 days @ 285° F.: 918 psi
Rheologies:

|  | RPM | | | | | |
| --- | --- | --- | --- | --- | --- | --- |
|  | 600 | 300 | 200 | 100 | PV | YP |
| 80° F. Mud | 59 | 32 | 23 | 14 | 27 | 5 |
| 190° F. Mud | 38 | 20 | 14 | 9 | 18 | 2 |
| 80° F. MTC | 286 | 167 | 119 | 66 | 119 | 48 |
| 190° F. MTC | 151 | 86 | 61 | 34 | 65 | 21 |

Table V gives yet additional data for a cement slurry having a density of 15.5 ppg converted from a lignosulfonate drilling fluid and which was prepared on a continuous mixing basis using a system similar to that shown in FIG. 2 wherein complete placement was carried out plus one complete recirculation of the cement slurry.

TABLE V

Formulation:
0.9 bbl 12.1 ppg Lignosulfonate Mud
0.10 bbl water
3.5 lbs SSMA
300 lbs Class H Portland Cement
105 lbs 100 mesh silica sand
30 lbs Calcium Sulfate
0.75 lbs WR-15
Thickening Time:
@ 250° F.: 14 hours, 50 min.
Compressive Strengths:
1 day @ 244° F.: 251 psi
3 days @ 244° F.: 338 psi
6 days @ 244° F.: 887 psi
Rheologies:

|  | RPM | | | | | |
| --- | --- | --- | --- | --- | --- | --- |
|  | 600 | 300 | 200 | 100 | PV | YP |
| 80° F. Mud | 40 | 22 | 16 | 10 | 18 | 4 |
| 80° F. MTC | 176 | 120 | 94 | 64 | 56 | 64 |

API fluid loss rate (Spec. 10) at 190° F. and a pressure differential of 1000 psi was 56 cc/30 min. through a 325 mesh screen.

Tables VI, VII, and VIII show, respectively, the properties of laboratory tests on drilling fluids converted to cement compositions (MTC) utilizing SSMA as a dispersant. A salt water drilling fluid or mud was used in laboratory tests illustrated in Table VI. The density of the salt "mud" was primarily due to the salinity of the water in the fluid sample which was used to prepare a 12.8 ppg cement composition.

In the examples set forth in the tables herein the amount of dispersant could be increased in at least some instances to provide lower viscosities. The amounts tabulated were specified for economic and slurry thickening time considerations. Moreover, the fluid loss rate of the cement slurries according to the invention was also in a desirable range as compared with conventional cement slurries.

TABLE VI

Formulation:
1 bbl 8.9 ppg Salt Mud
0.1 bbl Water
0.5 lbs SSMA
50 lbs Calcium Sulfate 12.8 ppg MTC
350 lbs Type 1 Cement
Thickening Times:
@ 150° F. 2 hrs, 50 min.
@ 100° F. 7 hrs, 50 min.
Compressive Strengths:
1 day @ 150° F.: 927 psi
2 days @ 150° F.: 843 psi
4 days @ 150° F.: 1218 psi
4 days @ 150° F.,
  then air-dryed 1 day @ 80° F.: 2523 psi
5 days @ 150° F.: 1200 psi
13 days @ 150° F.: 1175 psi
13 days @ 150° F.,
  then air-dryed 5 days @ 80° F.: 3143 psi
Rheologies:

|  | RPM | | | | | |
| --- | --- | --- | --- | --- | --- | --- |
|  | 600 | 300 | 200 | 100 | PV | YP |
| 80° F. MTC | 83 | 69 | 64 | 57 | 14 | 55 |

Table VII illustrates the cement strength development with various amounts of cement and the effectiveness of a retarder (WR-15). A cement composition having a density of 13.2 ppg was formulated.

TABLE VII

Formulation:
1 bbl 10.3 ppg Lignosulfonate Mud
0.15 bbl Water
0.7 lbs SSMA
25 lbs Calcium Sulfate
225 lbs Class H Portland Cement
78.75 lbs Silica Sand
Thickening Times:
With no retarder @ 210° F.: 8 hrs, 31 min
With 0.45 ppb WR-15 @ 210° F.:
17 hrs, 36 min
With 0.90 ppb WR-15 @ 210° F.:
31 hrs, 44 min Compressive strength (CS) was determined with the above formulation and with sand as a constant thirty five percent of cement by weight for various amounts of cement as indicated below:

| Blend No. | Cement lbs | Sand lbs | Density ppg | CS 2 Days psi | CS 5 Days psi |
| --- | --- | --- | --- | --- | --- |
| 1 | 175 | 61.25 | 12.7 | 339 | 633 |
| 2 | 200 | 70 | 13.0 | 304 | 717 |
| 3 | 225 | 78.75 | 13.2 | 352 | 687 |
| 4 | 250 | 87.5 | 13.5 | 374 | 830 |

API Fluid loss rate 190° F. and a pressure differential of 1000 psi was 112 cc/30 min. through a 325 mesh screen.

Table VIII gives formulation data, thickening time and compressive strengths of a lignosulfonate mud converted to cement having a density of 15.9 ppg and illustrates that the stability of the cement slurry after approximately two months at very high temperatures was quite good. Laboratory test cubes contained no cracks or other signs of degradation after exposure to a curing temperature of 300° F.

TABLE VIII

Formulation:
1 bbl 13.9 ppg Lignosulfonate Mud
0.1 bbl Water
0.02 bbl Kerosene
250 lbs. Class H Portland Cement

TABLE VIII-continued 87.5 lbs Silica Sand
50 lbs Calcium Sulfate
3.8 lbs SSMA
Thickening Time:
@ 250° F.: 5 hrs, 38 min
Compressive Strengths:
0.5 day @ 300° F.: 50 psi
1.5 days @ 300° F.: 252 psi
6 days @ 300° F.: 354 psi
27 days @ 300° F.: 548 psi
58 days @ 300° F.: 525 psi The foregoing examples illustrate that an improved cement composition and process has been provided for cementing oil and gas wells and similar subterranean formation voids or spaces requiring the displacement of a drilling fluid and the implacement of a cement material with requisite strengths. Recirculation of the cement slurry may be carried out to assure complete displacement of the drilling fluid with a material which will set to provide the requisite compressive strength.

As previously mentioned, tests with water based drilling muds converted to cement using Class A cement in the proportions of approximately 250 lbs. of cement per barrel of original drilling fluid and with additions of dispersant comprising SSMA in the range of up to 5.0 ppb to 6.0 ppb indicated a limit on viscosity reduction and anti-flocculation characteristics. Tests with the same mud converted to cement composition with citric acid added thereto as a dispersant also showed some anti-flocculation and viscosity reducing characteristics. However, the addition of citric acid and SSMA in the amounts of approximately 4.0 ppb of SSMA and 1.0 to 2.0 ppb of citric acid exhibited superior anti-flocculation and viscosity reduction characteristics indicating a synergistic effect of a dispersant using combined citric acid and SSMA. It is indicated that sodium citrate, gluco delta lactone, tartaric acid, and erthorbic acid would provide similar results. Table IX gives rheological data for mixtures utilizing selected disperants and having the dispersant and cement (cmt.) compositions indicated. The formulations are based on a polymer drilling mud having a density of 9.35 ppg and a temperature of 80° F.

TABLE IX

| Formulation | 600 | 300 | 200 | 100 | PV | YP |
|---|---|---|---|---|---|---|
| (1) 250 ppb Cl.H cmt. 5 ppb SSMA 3000 | | | would not mix | | | |
| (2) 250 ppb Cl.H cmt. 10 ppb citric acid | | | would not mix | | | |
| (3) 250 ppb Cl.H cmt. 5 ppb SSMA 1000 | 288 | 214 | 185 | 147 | 72 | 140 |
| (4) 250 ppb Cl.H cmt. 5 ppb SSMA 100 1 ppb citric acid | 187 | 115 | 89 | 60 | 72 | 43 |
| (5) 250 ppb Cl.G cmt. 4 ppb SSMA 3000 1 ppb citric acid | 205 | 150 | 125 | 96 | 55 | 95 |
| (6) 250 ppb Cl.G cmt. 4 ppb SSMA 3000 2 ppb citric acid | 168 | 110 | 87 | 61 | 58 | 52 |
| (7) 250 ppb Cl.G cmt. 4 ppb SSMA 3000 3 ppb citric acid | 175 | 111 | 86 | 57 | 64 | 57 |
| (8) 250 ppb Cl.G cmt. 4 ppb SSMA 3000 4 ppb citric acid | 181 | 114 | 88 | 59 | 67 | 57 |

Compositions (3) and (5) indicated high gellation characteristics while compositions (4) and (6) through (8) mixed well.

Table X gives data for cement compositions using the same type of mud as used for the example of Table IX but showing the advantages of using a partially hydrolysed polyacrylamide thinner (Thin-X thinner available from Magcobar-IMCO, Houston, Texas) in combination with the SSMA.

TABLE X

| Formulation | 600 | 300 | 200 | 100 | PV | YP |
|---|---|---|---|---|---|---|
| (1) 250 ppb Cl.H cmt. 5 ppb SSMA 3000 8.4 gal. pb water | 119 | 78 | 61 | 41 | 41 | 37 |
| (2) 250 ppb Cl.H cmt. 3 ppb SSMA 3000 8.4 gal. pb water | 122 | 81 | 64 | 44 | 41 | 40 |
| (3) 250 ppb Cl.H cmt. 2 ppb SSMA 3000 8.4 gal. pb water 1.8 gal. pb Thin-X | 115 | 75 | 59 | 39 | 40 | 35 |

The compositions in examples (1) and (3) mixed well while the example (2) did not.

As previously mentioned, the overall process of cementing a space in a wellbore according to the present invention may also include the displacement of drilling fluid with a preflushing medium which will further assure the displacement or removal of the drilling fluid and enhance the bonding of the cement to adjacent structures. For example, it is contemplated that the drilling fluid may be displaced from the wellbore, such as the wellbores illustrated in drawing FIGS. 1 and 2, by first pumping a preflush medium comprising in combination water, a sulfonated styrene copolymer dispersant with or without anionic and/or nonionic water wetting surfactants, and with or without viscosifying materials such as HEC, CMHEC, PHPA, Bentonite attapulgite, sepiolite and sodium silicate and with or without certain weighting materials such as barite, hematite, illmenite and/or sand to form a rheologically compatible medium for displacing the drilling fluid and then in itself be displaced by a conventional Portland cement mix or by the drilling fluid which has been converted to cement in accordance with the formulations of the present invention.

It will be further appreciated from the foregoing that an improved well cement composition and process have been developed wherein a drilling fluid or "mud" is converted to a cement composition by adding one or more cement materials and a dispersant to the drilling fluid and then recirculating the fluid to cement conversion composition through the wellbore to completely displace or convert the drilling fluid to a cement material which will set and provide a suitable means of sealing the wellbore around a casing or other tubing structure.

One preferred embodiment of the method involves producing the cement composition in a batch process until all of the drilling fluid required for the cementing operation or for disposal of the fluid is converted. Alternatively, the materials added to the drilling fluid to convert it to cement may be continuously added in a stream of drilling fluid as it is circulated to or from the wellbore. The cement composition is circulated into the wellbore and the circulation is continued through the wellbore until a total displacement of cement composition through the wellbore is equal to at least 100% to 1000% of the volume of the wellbore space. Moreover, the process of recirculating the drilling fluid converted to cement in a volume range of from 10% to 1000% of the displacement volume of the wellbore space provides substantial assurance that all of the drilling fluid has been displaced from the wellbore and that washouts, voids or other imperfections in the cement jacket or annulus are minimized.

A desirable cement composition in accordance with the present invention is one which permits complete circulation of the fluid out of the wellbore and replacement with the cement composition itself. Since this circulation may normally comprise two, and as many as ten, complete displacements of the system volume, which includes the wellbore, the mixing tanks or pits, and all of the interconnecting conduits, it is desirable that the composition not commence setting or thickening until circulation is complete. In this respect, it has been determined that one or more cement materials may be utilized with or without setting retarders to control the hydration rate or commencement of thickening before which an insignificant change in the rheological properties of the composition occurs during mixing and circulation. Moreover, the fluid loss properties are in a desirable range, similar to the base drilling fluid.

Although preferred embodiments of the present invention have been described in some detail herein, various substitutions and modifications may be made to the compositions and methods of the invention without departing from the scope and spirit of the appended claims.

What is claimed is:

1. A method for cementing a wellbore penetrating an earth formation into which a conduit extends, said wellbore having a space occupied by a drilling fluid to be converted to cement for cementing said space to form a seal between spaced apart points in said formation, said method comprising the steps of:
   providing means for adding cement material and a dispersant to said fluid, circulating said fluid and adding said cement material and said dispersant to a quantity of said fluid in predetermined proportions to form a settable cement composition;
   circulating said cement composition into said space to fill said space with said cement composition; and
   recirculating a quantity of said cement composition through said space.

2. The method set forth in claim 1, wherein:
   said dispersant comprises a sulfonated styrene copolymer selected from a group consisting of styrene sulfonic acid maleic anhydride, sulfonated styrene imide, and a sulfonated styrene copolymer in combination with a polyacrylate, a potassium salt, a phosphonate or a partially hydrolyzed polyacrylamide.

3. The method set forth in claim 2, wherein:
   said dispersant comprises at least one of a low molecular weight styrene sulphonic acid-maleic anhydride copolymer and a water soluble salt thereof, and said dispersant is added to said fluid together with cement material at a rate such as to minimize the gelling of said fluid upon adding said cement material to said fluid.

4. The method set forth in claim 3, wherein:
   said dispersant is added to said fluid at the rate of between 0.50 ppb and 10.0 ppb of fluid and said cement material is added to said fluid at the rate of 100 ppb of fluid to 600 ppb of fluid.

5. The method set forth in claim 4 wherein:
   said dispersant is mixed with said cement material before adding said cement material to said fluid.

6. The method set forth in claim 4 wherein:
   said cement composition is provided with a hydration rate control agent selected from a group consisting of calcium sulfate and calcium aluminate in the amount of from 10.0 ppb to 100.0 ppb.

7. The method set forth in claim 1, including the step of:
   adding at least two cement materials to said fluid to control the hydration rate of said cement composition and selected from a group consisting of Portland cement, calcium sulfate and calcium aluminate.

8. The method set forth in claim 1, including the step of:
   displacing drilling fluid from said space with a preflush composition comprising water and a sulfonated styrene copolymer to form a rheologically compatible material for displacing said drilling fluid prior to filling said wellbore space with said cement composition.

9. The method set forth in claim 1 wherein:
   said cement composition is formed by mixing a quantity of a water based drilling fluid comprising said fluid with;
   Portland Cement in a range of concentrations of from 100 pounds per original 42 U.S. gallon barrel of drilling fluid (ppb) to about 600 ppb;
   a dispersant comprising a low molecular weight styrene sulfonic acid-maleic anhydride copolymer in the range of less than about 5.0 ppb;
   calcium sulfate hemihydrate in the range of about 10.0 ppb to 100 ppb; and
   fine ground silica.

10. The method set forth in claim 1 wherein:
    said cement composition is recirculated at least twice the volume of said space.

11. A method for cementing a space in a wellbore penetrating an earth formation wherein said space in said wellbore is occupied by a drilling fluid, said method comprising the steps of:
    providing means for circulating said drilling fluid into and out of said space, said means for circulating including a tank for holding a quantity of said drilling fluid;
    adding cement material and a dispersant to a quantity of said drilling fluid outside of said space to form a cement composition;
    circulating said cement composition into said wellbore and continuing the circulation of said cement composition through said space until a total displacement of cement composition through said space is in a range of more than 100% and up to 1000% of the volume of said space.

12. The method set forth in claim 11 wherein said cement composition is formed by mixing said drilling fluid with;
    Portland Cement in a range of concentrations of from 100 pounds per original 42 U.S. gallon barrel of drilling fluid (ppb) to about 600 ppb;
    a dispersant comprising a low molecular weight styrene sulfonic acid-maleic anhydride copolymer in the range of less than about 5.0 ppb;

calcium sulfate hemihydrate in the range of about 10.0 ppb to 100 ppb; and
fine ground silica.

13. The method set forth in claim 11 wherein:
said dispersant and said cement material are mixed with a quantity of said drilling fluid to form said cement composition, and said cement composition is circulated into said wellbore to displace drilling fluid occupying said space to said tank, and said method includes repeating the steps of mixing cement material and dispersant into a quantity of drilling fluid until a quantity of cement composition is formed which is at least equal to the volume of a selected part of said space occupied by said drilling fluid.

14. The method set forth in claim 11 wherein:
said dispersant comprises at least one of a low molecular weight styrene sulphonic acid-maleic anhydride copolymer and a water soluble salt thereof, and said dispersant and said cement material are added to said drilling fluid at substantially the same time to form said cement composition.

15. The method set forth in claim 11 including the step of:
displacing said drilling fluid with a preflush composition for displacing said drilling fluid and to enhance the bonding of said cement to said conduit and said formation comprising water, a sulfonated styrene copolymer, a water wetting surfactant, a viscosifying material selected from a group consisting of HEC, CMHEC, PHPA, bentonite, attapulgite, sepiolite and sodium silicate, and a weighting material selected from a group consisting of barite, hematite, illmenite and sand to form a rheologically compatible composition for displacing said drilling fluid.

16. The method set forth in claim 15 including the step of:
displacing said preflush composition with said cement composition comprising:
a quantity of said drilling fluid mixed with
Portland Cement in the range of concentrations of from 100 pounds per original 42 U.S. gallon barrel of drilling fluid (ppb) to about 600 ppb;
a dispersant comprising a low molecular weight styrene sulfonic acid-maleic anhydride copolymer in the range of less than about 100 ppb;
calcium sulfate hemihydrate in the range of about 10.0 ppb to 100.0 ppb; and
silica sand.

17. A method for cementing a wellbore penetrating an earth formation into which a conduit extends, said wellbore having a space occupied by a drilling fluid to be displaced by a cement composition for cementing said space to form a seal between spaced apart points in said formation, said method comprising the steps of:
forming a cement composition by mixing a quantity of said fluid with Portland Cement in a range of concentrations of from 100 pounds per original 42 U.S. gallon barrel of drilling fluid (ppb) to about 600 ppb and a dispersant comprising a low molecular weight styrene sulfonic acid-maleic anhydride copolymer in the range of less than about 5.0 ppb;
providing means for displacing said fluid with said cement composition;
circulating said cement composition into said space to fill said space with said cement composition; and
recirculating a quantity of said cement composition through said space.

18. The method set forth in claim 17 including the step of: displacing said fluid from said space with a preflush composition to enhance the bonding of said cement to said conduit and said formation comprising water, a sulfonated styrene copolymer, a water wetting surfactant, a viscosifying material selected from a group consisting of HEC, CMHEC, PHPA, bentonite, attapulgite, sepiolite and sodium silicate, and a weighting material selected from a group consisting of barite, hematite, illmenite and sand.

* * * * *